(12) United States Patent
McBride et al.

(10) Patent No.: US 7,196,137 B2
(45) Date of Patent: Mar. 27, 2007

(54) POLYMER COMPOSITIONS

(75) Inventors: Tonya M. McBride, Providence, RI (US); Raman Patel, Cumberland, RI (US); Wayne Thornton, Whitman, MA (US); Keith G. Saunders, Cumberland, RI (US); Dexi Weng, Franklin, MA (US)

(73) Assignee: Teknor Apex Company, Pawtucket, RI (US)

( * ) Notice: Subject to any disclaimer, the term of this patent is extended or adjusted under 35 U.S.C. 154(b) by 0 days.

(21) Appl. No.: 10/071,040

(22) Filed: Feb. 8, 2002

(65) Prior Publication Data

US 2003/0153680 A1 Aug. 14, 2003

(51) Int. Cl.
*C08L 53/02* (2006.01)

(52) U.S. Cl. .............................. 525/97; 525/98; 525/99

(58) Field of Classification Search .................. 525/88, 525/98, 99, 97, 192
See application file for complete search history.

(56) References Cited

U.S. PATENT DOCUMENTS

| 4,202,801 | A | 5/1980 | Petersen |
| 4,247,652 | A | 1/1981 | Matsuda et al. |
| 4,248,758 | A | 2/1981 | Wright |
| 4,480,074 | A | 10/1984 | Wang |
| 4,607,074 | A | 8/1986 | Hazelton et al. |
| 4,801,651 | A | 1/1989 | Komatsu et al. |
| 4,845,145 | A | 7/1989 | Hazelton et al. |
| 4,849,472 | A | 7/1989 | Biglione et al. |
| 4,871,796 | A | 10/1989 | Komatsu et al. |
| 4,906,683 | A | 3/1990 | Komatsu et al. |
| 4,990,558 | A | 2/1991 | DeNicola, Jr. et al. |
| 5,187,224 | A | 2/1993 | Hamanaka et al. |
| 5,229,463 | A | 7/1993 | Yano et al. |
| 5,298,560 | A | 3/1994 | Aida et al. |
| 5,596,042 | A | 1/1997 | Itoh et al. |
| 5,597,867 | A | 1/1997 | Tsujimoto et al. |
| 5,621,045 | A | 4/1997 | Patel et al. |
| 5,824,400 | A | 10/1998 | Petrakis et al. |
| 5,843,577 | A | 12/1998 | Ouhadi et al. |
| 5,856,399 | A | 1/1999 | Itoh et al. |
| 5,869,591 | A | 2/1999 | McKay et al. |
| 5,948,850 | A | 9/1999 | Enami et al. |
| 5,969,034 | A | 10/1999 | Modic |
| 6,031,049 | A | 2/2000 | Chino et al. |
| 6,048,932 | A | 4/2000 | Okada et al. |
| 6,063,872 | A | 5/2000 | Nichols et al. |
| 6,087,435 | A | 7/2000 | Nakano et al. |
| 6,093,768 | A | 7/2000 | Nakano et al. |
| 6,143,818 | A | 11/2000 | Wang et al. |
| 6,169,145 | B1 | 1/2001 | Medsker et al. |
| 6,184,295 | B1 | 2/2001 | Okuyama |
| 6,218,474 | B1 | 4/2001 | Valligny et al. |
| 6,410,623 | B1 * | 6/2002 | Okuda ........................ 524/261 |
| 6,653,401 | B2 * | 11/2003 | Kinoshita et al. ............. 525/70 |
| 6,723,776 | B2 * | 4/2004 | Sakaki et al. ................ 524/474 |
| 2001/0053816 | A1 * | 12/2001 | Kinoshita et al. ............. 525/75 |
| 2003/0083434 | A1 * | 5/2003 | Ouhadi et al. ................. 525/80 |

FOREIGN PATENT DOCUMENTS

| EP | 1 116 747 A1 | 7/2001 |
| JP | 60-166339 | 8/1985 |
| JP | 10-237267 | 9/1998 |

OTHER PUBLICATIONS

Mitsubishi Petrochemical, CAPLUS AN1986:20572, abstracting JP60-166339 (1986).*

* cited by examiner

*Primary Examiner*—Jeffrey Mullis
(74) *Attorney, Agent, or Firm*—Fish & Richardson P.C.

(57) ABSTRACT

The invention is based on the discovery of useful combinations of fully cross-linked thermoplastic vulcanizates with styrenic block copolymers. The new combinations of the invention can provide a synergistic effect. Specifically, the compositions formed thereby can be both softer and more elastic than would be expected on the basis of the properties of the individual components. Such compositions can be used in numerous applications, including, for example, any application for which a soft material with very good recovery is desired.

9 Claims, No Drawings

POLYMER COMPOSITIONS

FIELD OF THE INVENTION

This invention relates to polymer compositions, and more particularly to polymer compositions that include a thermoplastic vulcanizate and a styrenic block copolymer.

BACKGROUND OF THE INVENTION

Various compositions of thermoplastic vulcanizates and styrenic block copolymers are known. Nonetheless, a need exists for compositions that are simultaneously softer and more elastic than the existing compositions.

SUMMARY OF THE INVENTION

The invention is based on the discovery of useful combinations of fully cross-linked thermoplastic vulcanizates with styrenic block copolymers. The new combinations of the invention can provide a synergistic effect. Specifically, the compositions formed thereby can be both softer and more elastic than would be expected on the basis of the properties of the individual components. Such compositions can be used in numerous applications, including, for example, any application for which a soft material with very good recovery is desired.

In general, the invention features a composition that includes a styrenic block copolymer (i.e., an "SBC"); and a substantially fully cross-linked thermoplastic vulcanizate ("TPV"). The SBC can have, for example, an A-B-A triblock copolymer structure, an A-B-A-B tetrablock copolymer structure, an A-B-A-B-A pentablock copolymer structure, or a mixture thereof, where, A can be, for example, a hard block made up of vinylarene monomers (e.g., styrene, α-methylstyrene, other styrene derivatives, or mixtures thereof) and B can be, for example, a soft block made up of olefinic monomers (e.g., ethylene, propylene, butylene, isoprene, butadiene, or mixtures thereof). In specific examples, the styrenic block copolymer can have, for instance, a styrene-ethylene butylene-styrene ("SEBS") structure, a styrene-ethylene propylene-styrene ("SEPS") structure, or a styrene-ethylene ethylene propylene-styrene ("SEEPS") structure. The thermoplastic matrix can be, for example, a polyolefin resin. The TPV can be, for example, a dynamically vulcanized blend of polyolefin resin and a rubber (e.g., a dynamically vulcanized blend of a thermoplastic matrix and an ethylene-propylene-diene copolymer ("EPDM") rubber). The SBC and TPV can be mixed in any proportions; preferably, the SBC/TPV ratio is at least about 5:100 (e.g., between about 5:100 and 400:100, between about 15:100 and 300:100, or intermediate ratios such as 10:100, 20:100, 50:100, 100:100, 150:100, 200:100, 250:100, 300:100, 400:100, 500:100, or 1000:100). The compositions can have a hardness of, for example, less than about 50 Shore A (e.g., 10 to 45 Shore A, 15 to 35 Shore A, or intermediate values such as 20, 25, or 30 Shore A). The compositions can have a 22 hour compression set at 70° C. of, for example, less than about 30% (e.g., about 10% to 25%, about 15% to 23%, or intermediate values such as 5%, 8%, 12%, 18%, or 20%).

Optionally, the new compositions can also include mineral oil. When present, the mineral oil can be mixed with the TPV and SBC in any proportions; preferably, when mineral oil is present, the mineral oil/TPV ratio is at least about 10:100 (e.g., between about 20:100 and 800:100, between about 25:100 and 600:100, or intermediate ratios such as 50:100, 100:100, 150:100, 200:100, 250:100, 300:100, 400:100, 500:100, or 1000:100).

The invention also features composition that includes (a) an SBC having an SEBS, SEPS, or SEEPS structure and (b) a substantially fully cross-linked blend of polypropylene and an EPDM rubber. Optionally, mineral oil can also be included in the composition.

As used herein, a "thermoplastic vulcanizate" (TPV) is a dynamically vulcanized, fully cross-linked mixture of a thermoplastic resin and an elastomer or rubber.

As used herein, "dynamic vulcanization" means a vulcanization or curing process for a rubber blended with a thermoplastic resin, where the rubber is vulcanized under conditions of shear at a temperature at which the mixture will flow. The rubber is thus simultaneously cross-linked and dispersed as fine particles within the thermoplastic resin matrix, although other morphologies can also exist. Dynamic vulcanization can be effected by mixing the thermoplastic vulcanizate components at elevated temperatures in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding, and compression molding. Scrap or flashing can be salvaged and reprocessed.

As used herein, "fully cross-linked" means that the rubber component has been cured or cross-linked to a state in which the elastomeric properties of the cross-linked rubber are similar to those of the rubber in its conventional vulcanized state, apart from the thermoplastic elastomer composition. The degree of cure can be described in terms of gel content, or conversely, extractable components. The rubber component can be described as fully cross-linked when less than about 5%, and preferably less than 3%, of the rubber which is capable of being cured is extractable from the thermoplastic elastomer product by a solvent for that rubber.

Dynamic vulcanization processes, including those resulting in fully cross-linked thermoplastic vulcanizates, are known in the art, for example, in U.S. Pat. Nos. 4,104,210, 4,130,534, 4,130,535, and 5,672,660, all of which are incorporated by reference in their entirety.

Other features and advantages of the invention will be apparent from the following description and from the claims.

DETAILED DESCRIPTION OF THE INVENTION

A composition is provided that includes a substantially fully cross-linked thermoplastic vulcanizate (TPV) and a styrenic block copolymer (SBC). The composition further optionally contains mineral oil and/or other additives.

The TPV can be, for example, a fully cross-linked blend of a plastic (e.g., a thermoplastic matrix) and an elastomer or rubber. Examples of thermoplastic matrices include polyolefin resins such as polyethylene, polypropylene, and ethylene vinyl acetate polymers (EVA).

Examples of suitable rubbers include ethylene-propylene-diene monomer (EPDM) rubber, ethylene-propylene rubber (EPR), styrene butadiene rubber, butadiene rubber, butyl rubber, and other non-polar or slightly polar rubbers. Both styrenic rubbers and ethylenic rubbers can be useful. Examples of diene monomers include ethylidene norbornene (ENB), dicyclopentadiene (DCPC), hexadiene, and vinyl norbornene (VNB).

A preferred TPV is Uniprene® Master Batch™, a 45 Shore A, fully cross-linked TPV available from Teknor Apex. For example, Uniprene® 7100-73, Uniprene® 7100-87, Uniprene® 7100-40D, or Uniprene® 7100-50D can be used.

The SBC can be, for example, a fully hydrogenated styrenic block copolymer having a structure such as styrene-ethylene butylene-styrene (SEBS), styrene-ethylene propylene-styrene (SEPS), or styrene-ethylene ethylene propylene-styrene (SEEPS), or a partially or fully unhydrogenated styrenic block copolymer having a structure such as styrene-butadiene-styrene (SBS) or styrene-isoprene-styrene (SIS). Kraton®-G SEBS (Kraton Polymers) products are preferred, with Kraton® G-1651, having the highest molecular weight, being most preferred, and G-1650 and G-1652, having intermediate and lower molecular weights, respectively, being less preferred.

Examples of suitable mineral oils include paraffinic, naphthenic, and aromatic types. Paraffinic mineral oils are preferred. A preferred paraffinic mineral oil is Semtol® 500 (Crompton Knowles).

The compositions can further contain additives including process aids such as calcium stearate or AC-6A polyethylene; plasticizers; lubricants; process stabilizers such as Irganox® 1010 (Ciba Specialty Chemicals), weathering stabilizers; heat stabilizers; UV protectants such as Tinuvin® 328 or 622 (Ciba Specialty Chemicals), antioxidants; colorants; and/or fillers. Other non-polar or slightly polar additives can also be included to provide desired properties.

The compositions are generally prepared according to conventional dry blend or other methods known to those skilled in the art of compounding.

The mixtures obtained from the blending process can be further compounded with a mixer such as a Banbury batch mixer, a Farrel Continuous Mixer, or a single- or twin-screw extruder.

The compositions are useful in a variety of applications. For example, these compositions are useful in any application in which it is desirable for compositions to have low compression set, high elasticity, and a soft texture, even when subjected to prolonged and/or repeating stretching or other mechanical or thermal stress. Such applications include grips for sporting goods (e.g., golf clubs and tennis rackets), tool handles, toothbrush handles, writing instruments (e.g., pens and pencils), and kitchen utensils (e.g., pan handles, knives, kitchen gadgets such as can openers and vegetable peelers); gaskets; and other seals. The invention also provides for coiled materials that are softer and require less force to stretch than prior art materials having otherwise similar physical properties.

In the following examples, the contents and properties of a number of preferred compositions are described. These compositions were prepared as follows, with reference to Table 1. The indicated styrenic block copolymer (SBC) was dry blended with the indicated mineral oil in a dry-blending device (e.g., a pony mixer or ribbon mixer) until the SBC had absorbed the oil and became free flowing. The time required for dry-blending varied from composition-to-composition, depending on the amount of oil added and the formulation. It was generally about five minutes. The dry-blended SBC/oil mixture was then melt-mixed with the indicated thermoplastic vulcanizate (TPV) in a Banbury mixer or twin-screw extruder. The two components (i.e., the SBC/oil mixture and the TPV) were either added to the melt-mixing equipment individually or else dry blended together prior to adding to the melt-mixing equipment. It is noted that the various components can be combined with each other in any order. Additives such as process aids, process stabilizers, weathering stabilizers, and colorants, if desired, can also be added prior to, during, or after the melt-mixing step.

TABLE 1

|  | Composition 1 | Composition 2 | Composition 3 |
|---|---|---|---|
| SBC | Kraton® G-1651 20 parts (12.5%) | Kraton® G-1651 40 parts (22.2%) | Kraton® G-1651 40 parts (18.2%) |
| Mineral Oil | Semtol® 500 40 parts (25%) | Semtol® 500 40 parts (22.2%) | Semtol® 500 80 parts (36.3%) |
| TPV | Uniprene® Master Batch™ 100 parts (62.5%) | Uniprene® Master Batch™ 100 parts (55.6%) | Uniprene® Master Batch™ 100 parts (45.5%) |

The properties of the compositions, including specific gravity (ASTM D792), hardness (ASTM D2240), tensile strength (ASTM D412), elongation at break (ASTM D412), 100% modulus (ASTM D412), tear strength (ASTM D624), percent weight change (ASTM D471), compression set (ASTM D395, method B), melt index (ASTM D1238), and viscosity (16/1 die, 200° C.) are indicated in Table 2.

TABLE 2

|  | Composition 1 | Composition 2 | Composition 3 | Units |
|---|---|---|---|---|
| Specific Gravity | 0.91 | 0.91 | 0.91 | — |
| Hardness (5 s delay) | 30 | 32 | 23 | Shore A |
| Tensile Strength | 378 | 373 | 319 | psi |
| Elongation at break | 369 | 345 | 407 | % |
| 100% Modulus | 114 | 118 | 78 | psi |
| Tear strength, Die C | 60 | 78 | 57 | pli |
| Weight change | 105 | 152 | 106 | % |
| Compression set |  |  |  |  |
| 22 h, 23° C. | 9.8 | 9.5 | 8.0 | % |
| 22 h, 70° C. | 18.5 | 17.8 | 17.6 | % |
| 70 h, 125° C. | 52.3 | 53.0 | 66.4 | % |
| Viscosity (shear rate) |  |  |  |  |
| 100 1/s | 329 | 617 | 322 | Pa-s |
| 500 1/s | 100 | 173 | 99 | Pa-s |
| 1000 1/s | 59 | 97 | 58 | Pa-s |

Seven additional compositions of the invention were prepared (Compositions 4–10) as described above using the compositions specified in Table 3, and compared with three controls: Uniprene® 7100-87 alone, Uniprene® 7100-40D alone, and Pebax® 3533. Each of these compositions of the invention and control compositions was fashioned into a rod having an outer diameter of 3/16". Each rod was then made into a coil with a length of 8" and an outer diameter of about 1". The force required to stretch each article to four times its original length (i.e., to 32") was measured, and is reported in Table 3. After 300 stretching cycles to 32", the length of each article was measured. This procedure was repeated once, and the average measurements obtained are indicated in Table 3. Other physical properties were also measured and are shown in Table 3.

TABLE 3

|  | Comp. 4 | Comp. 5 | Comp. 6 | Comp. 7 | Comp. 8 | Comp. 9 | Comp. 10 | TPV Control 1 | TPV Control 2 | Pebax Control 3 |
|---|---|---|---|---|---|---|---|---|---|---|
| SBC | 10 parts Kraton G-1651 | 20 parts Kraton G-1651 | 20 parts Kraton G-1650 | 20 parts Kraton G-1652 | 25 parts Kraton G-1651 | 25 parts Kraton G-1650 | 25 parts Kraton G-1652 | n/a | n/a | n/a |
| TPV | 90 parts Uniprene 7100-40D | 100 parts Uniprene 7100-40D | 100 parts Uniprene 7100-40D | 100 parts Uniprene 7100-40D | 100 parts Uniprene 7100-50D | 100 parts Uniprene 7100-50D | 100 parts Uniprene 7100-50D | 100 parts Uniprene 7100-87 | 100 parts Uniprene 7100-40D | n/a |
| Length after 300 cycles Immed. | 8.3" | 8.0" | 8.0" | 8.0" | 8.0" | 8.0" | 8.0" | 9.1" | 8.0" | 8.0" |
| 30 min. | 8.0" | 8.0" | 8.0" | 8.0" | 8.0" | 8.0" | 8.0" | 8.0" | 8.0" | 8.0" |
| Force to extend x4 | 980 parts | 820 parts | 765 parts | 560 parts | 1150 parts | 1410 parts | 1375 parts | 435 parts | 1250 parts | 665 parts |
| Spec. Grav. | 0.96 | 0.97 | 0.96 | 0.96 | 0.96 | 0.95 | 0.96 | 0.97 | 0.97 |  |
| Hardness Shore D (inst/10 sec) (ASTM D2240) | 42/33 | 40/32 | 41/33 | 42/32 | 48/40 | 49/40 | 51/42 | 35/28 | 47/38 |  |
| Tensile strength (MOLDs) | 2090 psi | 2250 psi | 2140 psi | 1740 psi | 2760 psi | 2740 psi | 2130 psi | 1390 psi | 1950 psi |  |
| Elongation at break (MOLDs) | 630% | 650% | 620% | 0590% | 670% | 640% | 600% | 480% | 580% |  |
| Melt index (g/10 min) (190° C./10 kg) | 11.5 | 6.8 | 5.1 | 10.8 | 7.1 | 5.8 | 9.9 | 48.0 | 11.0 |  |

A number of embodiments of the invention have been described. Nevertheless, it will be understood that various modifications may be made without departing from the spirit and scope of the invention. Accordingly, other embodiments are within the scope of the following claims.

The invention claimed is:

1. A method of making a polymeric composition, comprising:
   dynamically vulcanizing a cross-linkable ethylene-propylene-diene rubber in a polyolefin to provide a thermoplastic vulcanizate; and then
   after the dynamic vulcanization, combining the thermoplastic vulcanizate with components consisting of a styrene-ethylene-butylene-styrene block copolymer, and, optionally, mineral oil to provide the polymeric composition.

2. The method of claim 1, wherein the polyolefin includes polypropylene.

3. The method of claim 1, wherein the amount of the styrene-ethylene butylene-styrene block copolymer is at least about 5 parts per 100 parts of the thermoplastic vulcanizate.

4. The method of claim 3, wherein the amount of the styrene-ethylene butylene-styrene block copolymer is between about 5 parts and 400 parts per 100 parts of the thermoplastic vulcanizate.

5. The method of claim 4, wherein the amount of the styrene-ethylene butylene-styrene block copolymer is between 15 parts and 300 parts per 100 parts of the thermoplastic vulcanizate.

6. The method of claim 1, wherein the composition has a hardness less than about 50 Shore A.

7. The method of claim 1, wherein the composition has a hardness between about 10 and 45 Shore A.

8. The method of claim 1, wherein the mineral oil is included in the composition.

9. The method of claim 1, wherein the thermoplastic vulcanizate is combined with the components using melt blending.

* * * * *